(12) United States Patent
Mack, Jr. et al.

(10) Patent No.: US 9,937,366 B2
(45) Date of Patent: Apr. 10, 2018

(54) CHEMICAL OXYGEN GENERATOR WITH COMPACT IGNITION SYSTEM FOR POSSIBLE USE IN AN AIRCRAFT

(71) Applicant: AVOX Systems Inc., Lancaster, NY (US)

(72) Inventors: William A. Mack, Jr., Youngstown, NY (US); William A. Donofrio, Lancaster, NY (US); Dean A. Kubik, Basom, NY (US); Yelena Aleshina, Williamsville, NY (US)

(73) Assignee: AVOX Systems Inc., Lancaster, NY (US)

( * ) Notice: Subject to any disclaimer, the term of this patent is extended or adjusted under 35 U.S.C. 154(b) by 78 days.

(21) Appl. No.: 14/511,824

(22) Filed: Oct. 10, 2014

(65) Prior Publication Data

US 2015/0104355 A1    Apr. 16, 2015

Related U.S. Application Data

(60) Provisional application No. 61/889,658, filed on Oct. 11, 2013.

(51) Int. Cl.
  *C01B 13/02*   (2006.01)
  *A62B 21/00*   (2006.01)
  *A62B 7/08*    (2006.01)
  *A62B 7/14*    (2006.01)

(52) U.S. Cl.
  CPC .............. *A62B 7/08* (2013.01); *A62B 7/14* (2013.01); *A62B 21/00* (2013.01); *C01B 13/0211* (2013.01); *C01B 13/0218* (2013.01); *C01B 13/0296* (2013.01)

(58) Field of Classification Search
  CPC .................................. A62B 7/08; A62B 7/14

USPC ......................................................... 422/126
See application file for complete search history.

(56) References Cited

U.S. PATENT DOCUMENTS

| | | | |
|---|---|---|---|
| 2,004,243 A * | 6/1935 | Hloch ...................... | A62B 7/08 252/184 |
| 3,868,225 A | 2/1975 | Tidd | |
| 4,278,637 A | 7/1981 | McBride | |
| 4,427,635 A | 1/1984 | Hahn | |
| 4,536,370 A | 8/1985 | Hahn | |

(Continued)

FOREIGN PATENT DOCUMENTS

GB    451170    7/1936

OTHER PUBLICATIONS

International Patent Application No. PCT/US2014/060094, Search Report and Written Opinion dated Jan. 19, 2015.

*Primary Examiner* — Kevin Joyner
*Assistant Examiner* — Holly M Mull
(74) *Attorney, Agent, or Firm* — Kilpatrick Townsend & Stockton LLP; Dean W. Russell; Anthony L. Guebert

(57) ABSTRACT

A compact ignition system for chemical oxygen generators for possible use in an aircraft. The chemical oxygen generator is configured such that a majority of the ignition system can be accommodated within an interior of the generator body. In some embodiments, the ignition system is positioned within a recess of an upper surface of the core of the generator. Housing a majority of the ignition system within the generator allows the overall oxygen-generating capacity of the generator to be increased without requiring a corresponding increase in the overall length of the generator.

17 Claims, 3 Drawing Sheets

(56) References Cited

U.S. PATENT DOCUMENTS

| | | | |
|---|---|---|---|
| 4,891,189 A * | 1/1990 | Harwood, Jr. | B01J 7/00 |
| | | | 102/530 |
| 5,301,665 A * | 4/1994 | Jumpertz | A62B 7/08 |
| | | | 128/202.26 |
| 5,479,919 A | 1/1996 | Buchtal | |
| 5,725,834 A * | 3/1998 | Nishii | A62B 21/00 |
| | | | 422/126 |
| 5,772,976 A | 6/1998 | Cortellucci et al. | |
| 2005/0238546 A1 | 10/2005 | Holmes et al. | |
| 2014/0248195 A1 * | 9/2014 | Vigier | A62B 7/08 |
| | | | 422/240 |

\* cited by examiner

US 9,937,366 B2

CHEMICAL OXYGEN GENERATOR WITH COMPACT IGNITION SYSTEM FOR POSSIBLE USE IN AN AIRCRAFT

CROSS-REFERENCE TO RELATED APPLICATION

This application claims the benefit of U.S. Provisional Application Ser. No. 61/889,658 filed Oct. 11, 2013 and titled "Compact Ignition System for Chemical Oxygen Generators," the contents of which are incorporated herein by reference.

RELATED FIELD OF THE INVENTION

Embodiments of the invention generally relate to ignition systems for chemical oxygen generators.

BACKGROUND

Chemical oxygen generators are configured to release oxygen created by a chemical reaction that is triggered inside the generator. Chemical oxygen generators are used in a variety of applications and industries, including but not limited to, storing breathing oxygen in aircrafts. A chemical oxygen generator typically includes an ignition system that triggers the chemical reaction that generates the oxygen. With conventional chemical oxygen generators, the majority of the ignition system is external to the body of the generator due to space constraints within the generator.

SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Disclosed is a compact ignition system for a chemical oxygen generator. The compact ignition system is configured so that a majority of the ignition system is contained inside the body of the chemical oxygen generator, thus increasing the oxygen generating capacity of a generator of any given length. In some embodiments, an upper surface of the core of the chemical oxygen generator includes a recess designed to accommodate the ignition system.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION OF THE DRAWINGS

Figure 1:
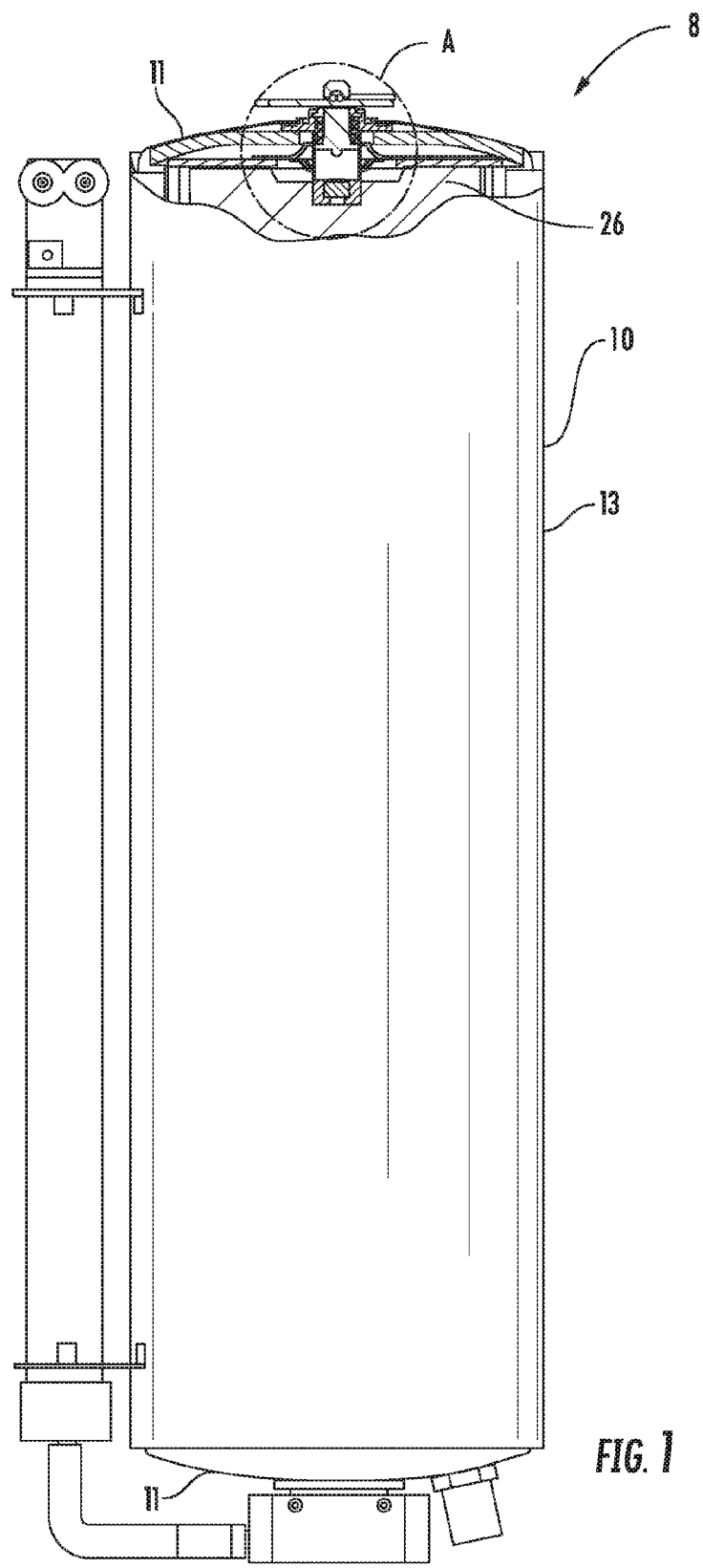
FIG. 1 is a side view of a chemical oxygen generator according to one embodiment, with a portion shown in a cut-away view.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein is a chemical oxygen generator 8 configured to generate oxygen via a chemical reaction of a core 26 within the generator 8. Chemical oxygen generator 8 includes an ignition system 12 that ignites the core 26 and starts the chemical reaction. Ignition system 12 includes a spring 14 that, when released, drives a firing plunger 22 into a primer cap 18 of the core 26 to start the chemical reaction and generate the oxygen. A safety pin 16 retains the spring 14 in a compressed position, thus storing energy until spring 14 is released.

Figure 2:
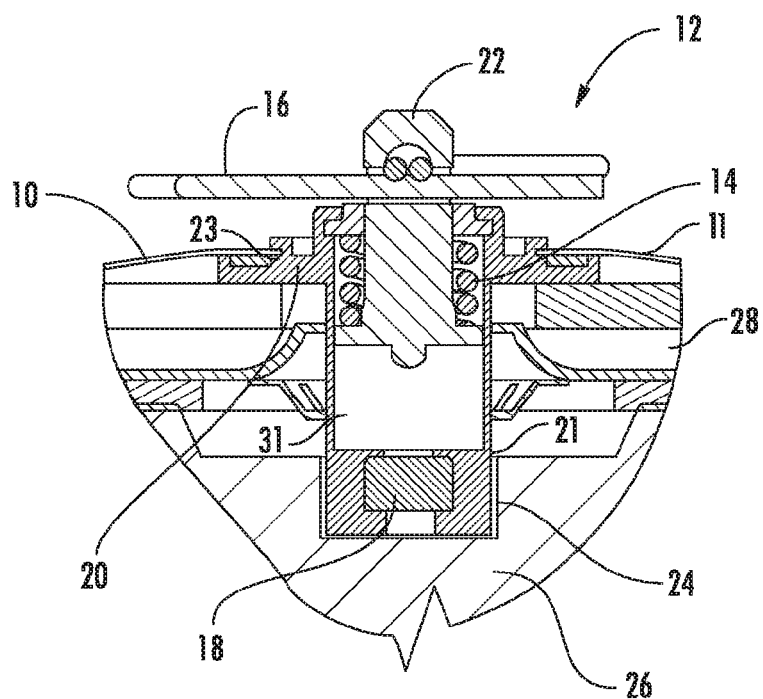
FIG. 2 is an enlarged view taken at inset circle A of FIG. 1.
Figure 3:
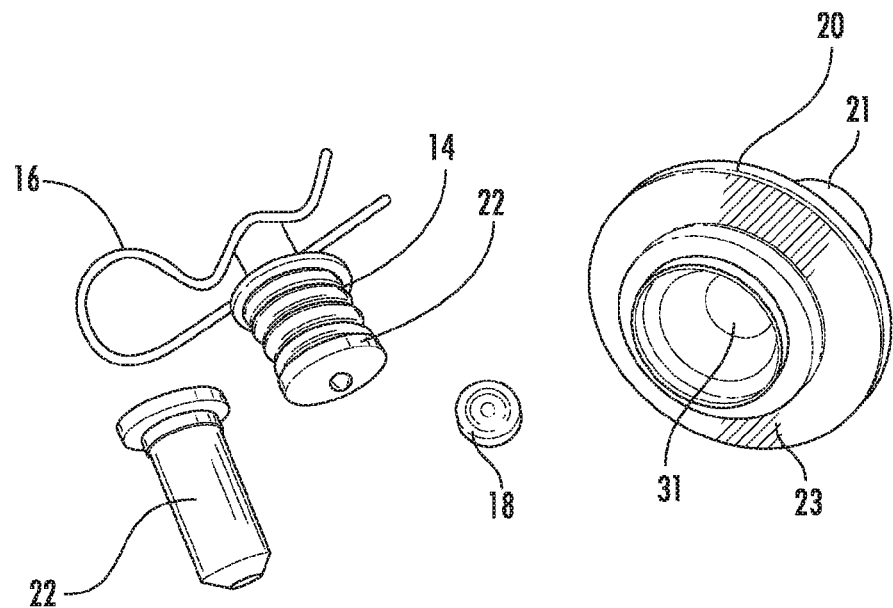
FIG. 3 are isolated views of some components of an ignition system according to one embodiment.

Chemical oxygen generator 8 includes a body 10 having a chemical core 26 that is designed to burn when ignited and produce oxygen. The body 10 includes end walls 11 and a side wall 13 extending between the end walls 11. An interior of the body 10 is designed to accommodate a majority of the ignition system 12. In this way, the majority of the ignition system 12 can be housed internally within the body 10 of the chemical oxygen generator 8. In some embodiments, as illustrated in FIG. 2, an upper surface of the core 26 of the generator 8 includes a recess 24 that receives a least a portion of the ignition system 12. A mounting flange 20 mounts the ignition system 12 within a cavity 28 in the body 10 between the upper surface of the chemical core 26 and a wall of the body 10. The mounting flange 20 includes a flange body 21 and a flange seat 23. The flange seat 23 defines a flange interior 31 (See FIGS. 2 and 3).

Figure 4:
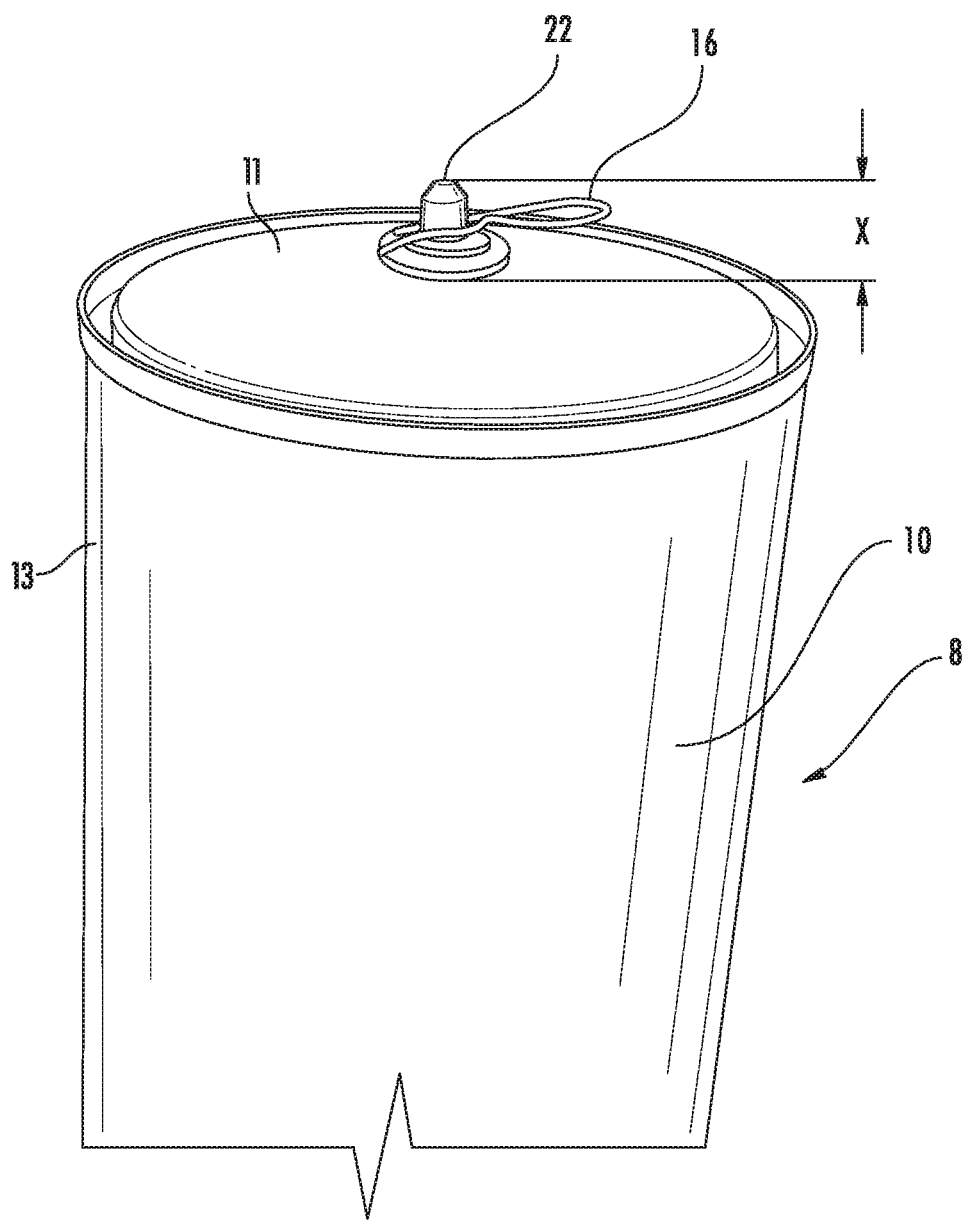
FIG. 4 is a perspective view of a portion of a chemical oxygen generator according to an embodiment.

As illustrated in FIG. 2, the majority of the spring 14 and the majority of the firing plunger 22 are positioned within the cavity 28 inside the body 10 of the chemical oxygen generator 8. Part of the flange 20 is also positioned within the cavity 28. In the illustrated embodiment, as shown in FIGS. 1-2 and 4, the pin 16, a portion of the firing plunger 22, a portion of the spring 14, and a portion of the flange 20 are external to the body 10 of the chemical oxygen generator 8. In the illustrated embodiment, the height of the spring 14, the height of the firing plunger 22, and the height of the flange 20 are all reduced so they can be accommodated within the cavity 28 inside the body 10 of the generator 8.

By designing the chemical oxygen generator 8 so that a majority of the ignition system 12 is housed within the body 10, the height X (FIG. 4) of the portion of the ignition system 12 that is external to the body 10 of the generator 8 is reduced. In some non-limiting embodiments, the height X is approximately 0.25 inches.

The dimensions of a chemical oxygen generator 8 can be limited by a number of factors. For example, if housed within an aircraft or other structure, existing enclosures of the generators 8 dictate the overall maximum dimensions of such generators. With the disclosed ignition system 12, the height X of the portion of the ignition system 12 that is external to the body 10 of the generator 8 is reduced, which increases the overall oxygen-generating capacity of the generator 8 without requiring a corresponding increase in the overall length of the generator 8. Thus, the duration of the generator 8 can be increased while still maintaining the overall dimensions of the generator. Put another way, the overall length of the generator 8 for any given oxygen generating capacity can be reduced.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

We claim:

1. A chemical oxygen generator comprising:
    a body comprising a side wall extending between two end walls, an interior, and a chemical core positioned within the interior, wherein the interior comprises a recess extending into an upper surface of the chemical core facing a first end wall of the two end walls;
    an ignition system comprising a spring, a pin configured to retain the spring in a compressed state, and a plunger;
    a flange that mounts a portion of the ignition system within the recess between the upper surface of the chemical core and the first end wall of the two end walls, the flange comprising:
        a flange body defining a flange interior, wherein the flange body at least partially extends into the recess, wherein the spring of the ignition system is positioned within the flange interior, and wherein the plunger is movable within the flange interior; and
        a flange seat extending in a radial direction from the flange body, a portion of the flange seat abutting the first end wall of the two end walls within the recess,
    wherein the ignition system is at least partially housed within the interior of the body of the chemical oxygen generator and a portion of the ignition system is external to the body,
    wherein the spring is movable within the flange interior between a compressed position and an expanded position,
    wherein movement of the spring from the compressed position to the expanded position moves the plunger within the flange interior, and
    wherein at least a portion of the spring is within a portion of the flange body that is at least partially surrounded by the chemical core when the spring is in the expanded position.

2. The chemical oxygen generator of claim 1, wherein the pin is external to the body of the chemical oxygen generator.

3. The chemical oxygen generator of claim 1, wherein a height of the portion of the ignition system external to the body is approximately 0.25 inches.

4. The chemical oxygen generator of claim 1, wherein, when the pin is released, the spring expands from the compressed position and drives the plunger into a primer cap that ignites the chemical core.

5. The chemical oxygen generator of claim 1, wherein the chemical core is designed to burn when ignited and produce oxygen.

6. A chemical oxygen generator comprising:
    a body comprising an interior and a chemical core positioned within the interior, wherein the chemical core is designed to burn when ignited and produce oxygen, and wherein an upper surface of the chemical core includes a recess;
    an ignition system comprising a spring, a pin configured to retain the spring in a compressed state, and a plunger; and
    a flange that mounts a portion of the ignition system within the interior of the body between the upper surface of the chemical core and the body such that
    a portion of the ignition system is housed within the recess of the chemical core and a portion of the ignition system is external to the interior of the body,
    wherein the flange defines a flange interior that houses the spring and at least a portion of the plunger of the ignition system,
    wherein the spring is movable within the flange interior between a compressed position and an expanded position,
    wherein movement of the spring from the compressed position to the expanded position moves the plunger within the flange interior, and
    wherein at least a portion of the plunger is within a portion of the flange that is located within the interior of the body between the upper surface of the chemical core and the body and at least partially surrounded by the chemical core when the spring is in the expanded position.

7. The chemical oxygen generator of claim 6, wherein the pin is external to the body of the chemical oxygen generator.

8. The chemical oxygen generator of claim 6, wherein a height of the portion of the ignition system external to the body is approximately 0.25 inches.

9. The chemical oxygen generator of claim 6, wherein, when the pin is released, the spring expands from the compressed position and drives the plunger into a primer cap that ignites the chemical core.

10. The chemical oxygen generator of claim 6, wherein at least a portion of the flange is located within the interior of the body.

11. The chemical oxygen generator of claim 6, wherein the body comprises a sidewall extending between two end walls, and wherein the interior of the body is located between the sidewall and the two end walls.

12. The chemical oxygen generator of claim 11, wherein:
    an upper surface of the chemical core faces a first of the two end walls, and the recess is between the upper surface of the chemical core facing the first of the two end walls and extends into the upper surface of the chemical core; and a portion of the spring and a portion of the plunger are located within the recess.

13. A chemical oxygen generator comprising:

a body comprising an interior and a chemical core positioned within the interior, wherein an upper surface of the chemical core includes a recess and wherein the chemical core is designed to burn when ignited and produce oxygen;

an ignition system comprising a spring, a pin configured to retain the spring in a compressed state, and a plunger; and a flange that mounts the ignition system within the interior of the body, wherein the flange defines a flange interior housing the spring and at least a portion of the plunger, wherein a portion of the spring and a portion of the plunger are housed within the interior of the body and a portion of the ignition system is external to the interior of the body, wherein a height of the portion of the ignition system external to the interior of the body is approximately 0.25 inches, wherein the spring is movable within the flange interior between a compressed position an expanded position, wherein movement of the spring from the compressed position to the expanded position moves the plunger within the flange interior such that the plunger is driven into a primer cap and ignites the chemical core, and wherein at least a portion of the spring is within a portion of the flange that is at least partially surrounded by the chemical core when the spring is in the expanded position.

14. The chemical oxygen generator of claim 13, wherein the pin is external to the body of the chemical oxygen generator.

15. The chemical oxygen generator of claim 13, wherein at least a portion of the flange is located within the interior of the body.

16. The chemical oxygen generator of claim 13, wherein the body comprises a sidewall extending between two end walls, and wherein the interior of the body is located between the sidewall and the two end walls.

17. The chemical oxygen generator of claim 16, wherein:

an upper surface of the chemical core faces a first of the two end walls, and the recess is between the upper surface of the chemical core facing the first of the two end walls and extends into the upper surface of the chemical core; and a portion of the spring and a portion of the plunger are located within the recess.

* * * * *